United States Patent [19]
Gannett

[11] Patent Number: 6,118,452
[45] Date of Patent: Sep. 12, 2000

[54] FRAGMENT VISIBILITY PRETEST SYSTEM AND METHODOLOGY FOR IMPROVED PERFORMANCE OF A GRAPHICS SYSTEM

[75] Inventor: Ethan W. Gannett, Fort Collins, Colo.

[73] Assignee: Hewlett-Packard Company, Palo Alto, Calif.

[21] Appl. No.: 08/906,401

[22] Filed: Aug. 5, 1997

[51] Int. Cl.⁷ .................................................. G06T 17/00
[52] U.S. Cl. .......................................... 345/418; 345/430
[58] Field of Search .................................... 345/418, 419, 345/420, 421, 422, 430

[56] References Cited

U.S. PATENT DOCUMENTS

| | | | |
|---|---|---|---|
| 5,150,457 | 9/1992 | Behm et al. | 345/420 |
| 5,579,455 | 11/1996 | Greene et al. | 345/421 |
| 5,742,353 | 4/1998 | Yasuki et al. | 345/418 |
| 5,793,371 | 8/1998 | Deering | 345/418 |
| 5,886,701 | 3/1999 | Chauvin et al. | 345/418 |

*Primary Examiner*—Phu K. Nguyen
*Assistant Examiner*—Cliff N. Vo

[57] ABSTRACT

Methods and apparatus for processing graphics information in a computer graphics system for processing graphics information to be rendered on a display screen are provided. The computer graphics system includes a graphics library and graphics hardware together defining a graphics pipeline, and a graphics application program invoking operations in the graphics pipeline through an application program interface provided by the graphics library. The graphics pipeline includes a visibility pretest module, located at a first operational position in the graphics pipeline, configured to determine whether a pixel will be visible or non-visible on the display screen. The pipeline also includes one or more time-intensive modules operationally located at a second position in the graphics pipeline subsequent said first operational position; and a process controller configured to prevent said one or more time-intensive modules from performing operations related to said non-visible pixels. Advantageously, the present invention enables the graphics system to selectively perform graphics pipeline operations which are related to pixels which are ultimately displayed on the display. The processing associated with performing operations on non-displayed pixels is avoided thereby providing the graphics system with significant performance enhancements.

28 Claims, 8 Drawing Sheets

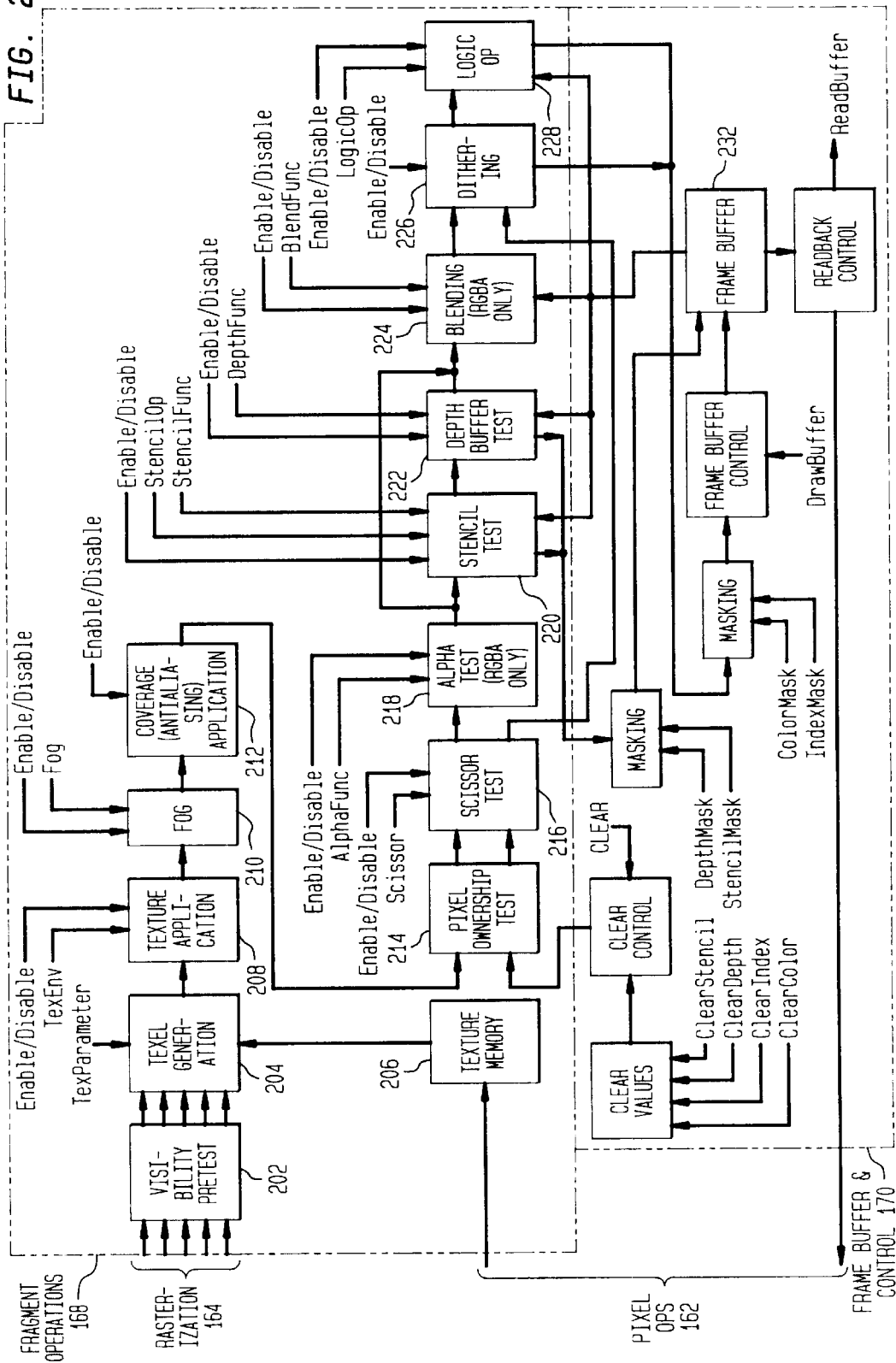

FRAGMENT VISIBILITY PRETEST SYSTEM AND METHODOLOGY FOR IMPROVED PERFORMANCE OF A GRAPHICS SYSTEM

BACKGROUND OF THE INVENTION

1. Field of the Invention

The present invention relates generally to computer graphics systems and, more particularly, to methods and apparatus for efficiently managing the processes performed in a computer graphics pipeline.

2. Related Art

Computer graphics systems are commonly used for displaying two- and three-dimensional graphics representations of objects on a two-dimensional video display screen. Current computer graphics systems provide highly detailed representations and are used in a variety of applications.

In a typical computer graphics system, an object to be represented on the display screen is broken down into graphics primitives. Primitives are basic components of a graphics display and may include, for example, points, lines, quadrilaterals, triangle strips, and polygons. Typically, a hardware/software scheme is implemented to render, or draw, the graphics primitives that represent a view of one or more objects being represented on the display screen.

Generally, the primitives of a three-dimensional object to be rendered are defined by a graphics application residing on a host computer in terms of primitive data. For example, when the primitive is a triangle, the host computer may define the primitive in terms of the X, Y, Z and W coordinates of its vertices, as well as the red, green, blue and alpha (R, G, B and α) color values of each vertex. Additional primitive data such as texture mapping data may be used in some applications. Rendering hardware interpolates the primitive data to compute the display screen pixels that represent each primitive, and the R, G and B color values for each pixel.

Texture mapping permits objects to be displayed with improved surface detail. Texture mapping is a method that involves mapping a source image, referred to as a texture, onto the surface of a three-dimensional object, and thereafter projecting the textured three-dimensional object to the two-dimensional graphics display screen to display the resulting image. Texture mapping involves applying one or more point elements (texels) of a texture to each point element (pixel) of the object image to which the texture is being applied. Texture mapping hardware subsystems typically include a local memory cache that stores texture mapping data associated with the portion of the object being rendered. Surface detail attributes which are commonly texture-mapped include color, specular reflection, vector perturbation, specularity, transparency, shadows, surface irregularities and grading.

The basic components of a computer graphics system typically include a computer graphics library that contains software routines which control graphics hardware in response to function calls issued by the graphics application. The graphics hardware may include, for example, a geometry accelerator, a rasterizer and a frame buffer. The system may also include other hardware such as texture mapping hardware. The geometry accelerator receives primitive data from the graphics application which defines the primitives that make up the model view to be displayed. The geometry accelerator performs transformations on the primitive data and performs such functions as lighting, clipping and plane equation calculations for each primitive. The output of the geometry accelerator, referred to as rendering data, is used by the rasterizer and the texture mapping hardware to generate final screen coordinate and color data for each pixel and each primitive. The pixel data from the rasterizer and the pixel data from the texture mapping hardware are combined and stored in the frame buffer for display on the video display screen.

The graphics library typically provides an application program interface (API) to enable graphics applications executing on the host computer to efficiently control the graphics hardware. Commonly, the OpenGL® standard is utilized to provide a graphics library API to the graphics system. (OpenGL is a registered trademark of Silicon Graphics, Inc.).

The OpenGL software interface provides specific command, that are used to specify objects and operations to produce interactive, three-dimensional graphics applications. OpenGL is a streamlined, hardware-independent interface designed to be implemented on many different hardware platforms. As such, in computer systems which support OpenGL, the operating systems and graphics application software programs can make function calls to the computer graphics system according to the standardized API without knowledge of the underlying hardware configuration.

The OpenGL standard provides a complete library of low-level graphics manipulation commands for describing models of three-dimensional objects (the "GL" of OpenGL refers to "graphics library"). This standard was originally based on the proprietary standards of Silicon Graphics, Inc., but was later transformed into an open standard which is used in high-end graphics-intensive work stations, and, more recently, in high-end personal computers. The OpenGL standard is described in the "OpenGL Programming Guide", version 1.1 (1997), the "OpenGL Reference Manual", version 1.1 (1997), and the "OpenGL Specification", version 1.1 (1997), all of which are hereby incorporated by reference in their entirety.

Various techniques have been employed to improve the performance of graphics systems. Due to the large number of at least partially independent operations which are performed in rendering a graphics image, proposals have been made to use some form of parallel architecture for graphics systems. One common approach to achieving parallelism in computer graphics processing is a technique known as pipelining. In such an approach, individual processing stages are, in effect, connected in series in an assembly-line configuration. One processing stage performs a first set of operations on one set of data, and then passes that data along to another processing stage which performs a second set of operations, while at the same time the first processing stage performs the first set of operations again on another set of data.

The graphics library is typically logically divided into software routines which are accessible through the API and perform various operations and device specific software routines which include software programs dedicated to the control of specific graphics hardware components. Together, the device specific software routines and the graphics hardware components define what is commonly referred to as a graphics pipeline. In computer systems which support OpenGL, this graphics pipeline is often referred to as an OpenGL graphics processing pipeline.

The graphics library is required to download very large quantities of data to the graphics hardware. For example, the data for a single quadrilateral may be on the order of 64 words of 32 bits each. A single frame of a graphics display typically includes hundreds of thousands of primitives. Thus, the efficiency with which primitive data is downloaded to the graphics hardware, and the speed at which the graphics hardware processes the primitive data, are important factors in achieving high speed in graphics systems. Accordingly, it is desirable to provide methods and apparatus for efficiently processing graphics information in a computer graphics system and which optimally utilizes available data bandwidth in the graphics pipeline.

SUMMARY OF THE INVENTION

According to the present invention, methods and apparatus for processing graphics information in a computer graphics system for processing graphics information to be rendered on a display screen are provided. The computer graphics system includes a graphics library and graphics hardware together defining a graphics pipeline, and a graphics application program invoking operations in the graphics pipeline through an application program interface provided by the graphics library. The graphics pipeline includes a visibility pretest module, located at a first operational position in the graphics pipeline, configured to determine whether a pixel will be visible or non-visible on the display screen. The pipeline also includes one or more time-intensive modules operationally located at a second position in the graphics pipeline subsequent said first operational position; and a process controller configured to prevent said one or more time-intensive modules from performing operations related to said non-visible pixels.

Advantageously, the present invention enables the graphics system to selectively perform graphics pipeline operations which are related to pixels which are ultimately displayed on the display. The processing associated with performing operations on non-displayed pixels is avoided thereby providing the graphics system with significant performance enhancements.

The one or more time-intensive modules may include one or more first computationally-expensive modules such as a texel generation module. Alternatively, the one or more time-intensive modules may include one or more second modules which accesses graphics hardware components of the graphics pipeline. Such modules may be, for example, modules which read data from a buffer in a frame buffer of the computer graphics system.

In one embodiment, the visibility pretest module includes ore or more pretest modules each performing per-fragment operations in the graphics pipeline indicating whether a pixel associated with each fragment will not be visible on the display, and having a prior operational location after said one or more time-intensive modules, wherein said one or more pretest modules are sufficiently collectively operationally-independent of said one or more time-intensive modules and other modules in the graphics operationally located after said texel generation modules. Preferably, the other modules comprises modules interposed between said one or more time-intensive modules and said prior operational locations and operational modules located after said prior operational location.

Preferably, the visibility pretest module performs operations associated with said one or more pretest modules. Also, it is preferred that the one or more pretest modules includes a depth pretest module and a stencil pretest module. In other embodiments of the invention the one or more pretest modules may also include a stipple pretest module. Preferably, the graphics library comprises OpenGL graphics library.

In another aspect of the present invention, a system for reducing the time necessary to render an image in a computer graphics system is disclosed. The system includes one or more per-fragment operations modules including a texel generation module; a visibility pretest module constructed and arranged so as to pretest a fragment to determine whether the fragment will be displayed on a display screen included within the computer graphics system, wherein the visibility pretest module operationally performed prior to the texture generation module; and means for controlling operations of the per-fragment operations modules and the texel generation module based upon whether the fragment is to be displayed.

Preferably, the visibility pretest module includes one or more pretest modules each performing per-fragment operations in the graphics pipeline indicating whether a pixel associated with each fragment will not be visible on the display, and having a prior operational location after the one or more time-intensive modules, wherein the one or more pretest modules are sufficiently collectively operationally-independent of the one or more time-intensive modules and other modules in the graphics operationally located after the texel generation modules.

In one embodiment, the one or more per-fragment operations modules further includes modules interposed between the texel generation module and the prior operational locations; and operational modules located after the prior operational location. In another embodiment, the one or more pretest modules includes a depth pretest module; a stencil pretest module; and a stipple pretest module.

In another aspect of the present invention, a method for determining whether to perform certain per-fragment operations in a graphics pipeline. The method includes the steps of: pretesting each fragment in a span to be displayed to determine whether each fragment of a current span is to be rendered to the screen prior to that high computational block; and controlling performances of remaining per-fragment operations based upon whether the pretesting step indicates the fragment is not to be rendered to the screen.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The present invention is pointed out with particularity in the appended claims. The above and further advantages of this invention may be better understood by referring to the following description when taken in conjunction with the accompanying drawings, in which:

FIG. 2 is a detailed block diagram of the per-visible fragment operations and frame buffer and control processing stages of the exemplary graphics pipeline illustrated in FIG. 1B;

DETAILED DESCRIPTION

Figure 1A:
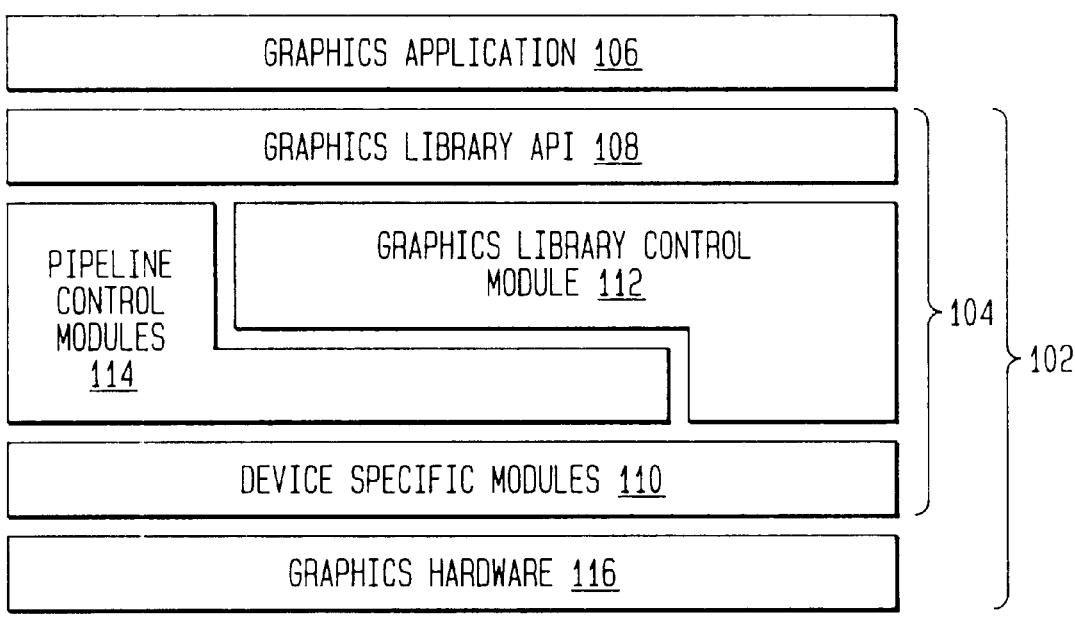
FIG. 1A is an architectural block diagram of an exemplary computer graphics system suitable for incorporation of the visibility pretest system and methodology of the present invention.

FIG. 1A is an architectural block diagram of an exemplary computer graphics system suitable for incorporation of the visibility pretest apparatus and methodology of the present invention. As shown, the system provides a well-known computer platform on which software applications, such as graphics application 106, executes. The system communicates with and is responsive to the graphics application 106. The computer graphics system includes a graphics library 104 and device specific modules 110 through which the graphics application 106 controls graphics hardware 116 of the graphics system.

The graphics library 104 provides an application program interface (API) 108 of function calls through which the graphics application 106 communicates with the graphics library 104. The graphics library API 108 enables the graphics application 106 to efficiently control the graphics system. The graphics library API 108 is preferably a streamlined, hardware-independent interface designed to be implemented on many different computer platforms such as graphics system 102. As such, the graphics application 106 issues function calls to the computer graphics system 102 according to the standardized API 108 without knowledge of the configuration of the underlying graphics hardware 116. In the graphics system environment, the graphics library 104 provides specific commands that are used to specify objects and operations to produce interactive, three-dimensional applications.

In one preferred embodiment, the graphics library API 108 is an OpenGL® API, available from, for example, Silicon Graphics, Inc. The OpenGL API provides a graphics library of low-level graphics manipulation commands for describing models of three-dimensional objects. The OpenGL standard is described in the "OpenGL Programming Guide," version 1.1 (1997), the "OpenGL Reference Manual," version 1.1 (1997) and the "OpenGL Specification," version 1.1 (1997), all of which are hereby incorporated by reference in their entirety. However, as one skilled in the relevant art will find apparent, the graphics library API 108 may be any other proprietary or publicly available graphics library such as the commonly-available PEX (PHIGS Extension to X) library available from, for example, the X-Consortium. The graphics application 106 may be any graphics software application now or later developed that is capable of communicating with the graphics system 102 through the implemented graphics library API 108. Such graphics applications may be, for example, a database, a CAD/CAM application, an architectural design application, a civil engineering application, a word processing package, or the like.

The graphics library 104 includes a graphics library control module 112 and pipeline control modules 114. The graphics library control module 112 performs well-known functions such as managing the publicly visible graphics library state information and informing the other components of the graphics library 104 of state changes. The graphics library control module 112 generally includes graphics library functions defined by the API 108 and corresponding data structures that store the above state information.

The pipeline control modules 114 perform well-known operations associated with controlling the graphics pipeline. The pipeline control modules 114 maintain derived internal graphics state information and provide such state information to the device specific modules 110 and the graphics hardware 116. Operations includes scheduling operators, buffering vertex API data and executing operators on primitives to generate data for rasterizers located in the graphics hardware 116. These functions and operations are considered to be well-known in the art.

The device-specific modules 110 provide primitive data, including vertex state (coordinate) and property state (color, lighting, etc.) data to the graphics hardware 116. The graphics hardware 116 may be any well-known graphics hardware such as the Visualize FX4 Graphics System, available from Hewlett-Packard Company, Palo Alto, Calif. The computer graphics system 102 is typically a high performance workstation such as an HP Visualize Workstation also manufactured and sold by Hewlett-Packard Company. The computer graphics system 102 preferably includes at least 64 megabytes of memory and a hard disk with a capacity of 4.0 gigabytes or more. The computer graphics system preferably implements the HP-ux operating system, which is a UNIX based operating system. The graphics library 104, including the graphics API 108, may be implemented, for example, using the C programming language. It will be understood that any workstation or other computer having similar capabilities may be utilized within the scope of the present invention.

Figure 1B:
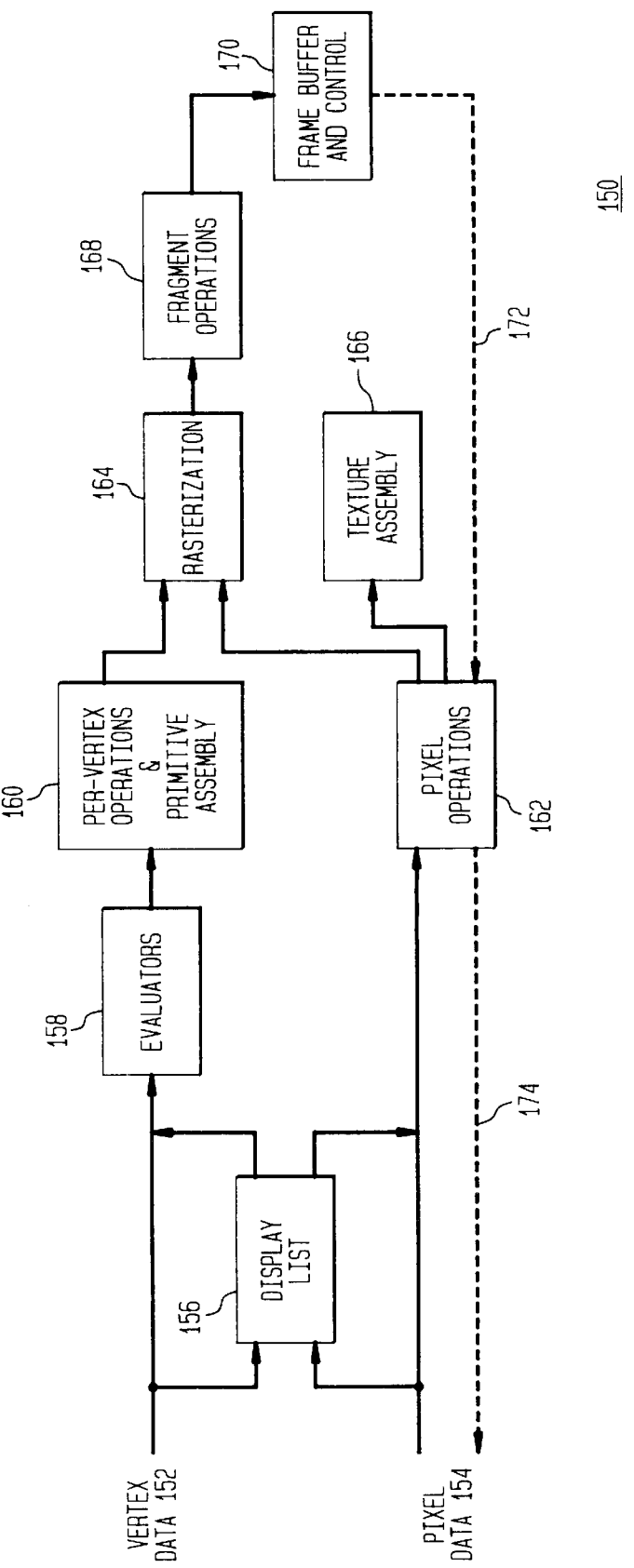
FIG. 1B is a functional block diagram of an exemplary graphics pipeline suitable for incorporation of the visibility pretest system and methodology of the present invention.

The graphics hardware 116, device specific modules 110 and pipeline control module 114 define a pipelined architecture. A functional block diagram of a graphics pipeline implemented in accordance with the OpenGL graphics library specification, is illustrated in FIG. 1B. The graphics pipeline 110 illustrated in FIG. 1B is commonly referred to as an OpenGL graphics pipeline or an OpenGL rendering pipeline.

Vertex or geometric data 152 (vertices, lines, and polygons) follow a path through the processing stages that include the evaluators processing stage 158 and per-vertex operations and primitive assembly processing stage 160.

Pixel data 154 (pixels, images and bit maps) are treated differently for the initial portion of the OpenGL rendering pipeline 150. Pixel data 154 is processed by pixel operations processing stage 162 and, in the illustrative embodiment, texture assembly processing stage 166. Pixel data 154 then undergoes the same final processing stages as vertex data 152 through the rasterization processing stage 164 and fragment operations processing stage 168 to the frame buffer and control processing stage 170.

The fragment operations processing stage 168 is configured in accordance with the present invention to perform operations on only those fragments which define pixels which will likely be subsequently displayed on the display screen. The other processing stages illustrated in FIG. 1B are configured in accordance with the specified OpenGL rendering pipeline as described in the "OpenGL Programmer's Guide," "OpenGL Specification," and "OpenGL Reference Manual" incorporated herein by a prior reference and are therefore discussed only briefly below.

All data, whether it describes geometry vertex (vertex data 152) or pixels (pixel data 154) can be processed immediately in the pipeline 150. Alternatively, the data 152, 154 can be saved in a display list 156 for current or later use. When a display list 156 is executed, the retained data is sent from the display list 156 as if it were sent by the graphics application 106 to be processed immediately. As noted, vertex data 152 is received by the evaluators processing stage 158.

All geometric primitives are eventually described by vertices. Parametric curves and surfaces may be initially described by control points and polynomial functions. The evaluators processing stage 158 performs operations to derive the vertices used to represent the surface from the control points. One common method known as polynomial mapping can produce surface normal, texture coordinates, colors, and spacial coordinate values from the control points.

The vertex data 152 then enters the per-vertex operations and primitive assembly processing stage 160 wherein the vertices are converted into primitives. Here, spacial coordinates are projected from a position in the three-dimensional world to a position on the two-dimensional display screen. In the illustrative embodiment wherein texturing is used, texture coordinates are generated and transformed in the processing stage 160. If lighting is enabled, the lighting calculations are performed using transformed vertex, surface normal, light source position, material properties, and other lighting information to produce a color value.

With respect to primitive assembly, the processing stage 160 performs clipping operations. Clipping is the elimination of portions of geometry which fall outside a half-space, defined by a plane. Point clipping simply passes or rejects vertices; line or polygon clipping can add additional vertices depending upon how the line or polygon is clipped. In some cases, this is followed by perspective division, which makes distant geometric objects appear smaller than closer objects. Then view port and depth operations are applied. If culling is enabled and the primitive is a polygon, it then may be rejected by a culling test. The results of the pixel operations processing stage 162 are complete geometry primitives, which are the transformed and clipped vertices with related color, depth, and sometimes texture-coordinate values and guidelines for the rasterization processing stage 164.

Pixel data 154 is first processed by the pixel operations processing stage 162. Pixels from an array in a system memory are first unpacked from one of a variety of formats into the proper number of components. Then, the data is scaled, biased and processed by a pixel map. The results are clamped and then either written into a texture memory in texture assembly 166 or sent to the rasterization processing stage 164.

If pixel data 154 is read from a frame buffer in processing stage 170, as shown by dashed lines 172, pixel-transfer operations (scale, bias, mapping and clamping) are performed by the pixel operations processing stage 162. These results are packed into an appropriate format and returned to an array in system memory via dashed line 174. In the illustrative embodiment illustrated in FIG. 150, the texture assembly processing stage 166 applies texture images onto geometric objects in any well-known manner.

In the rasterization processing stage 164, both geometric data 152 and pixel data 152 are converted into fragments. Each fragment square corresponds to a pixel in the frame buffer. Line and polygon stipples, line width, point size, shading model and coverage calculations to support anti-aliasing are taken into consideration as vertices are connected into lines or the interior pixels are calculated for a filled polygon. Color and depth values are assigned for each fragment square in the rasterization processing stage 164. In the fragment operations processing stage 168, a series of optional operations are performed that may alter or eliminate fragments. In accordance with the present invention, the fragment operations processing stage 118 implements the visibility pretest apparatus and methodology of the present invention to provide a technique for high efficiency processing of fragments by the graphics pipeline 150. Once the fragment has been thoroughly processed, it is drawn into an appropriate, frame buffer as a pixel to be rendered on the video display screen. The details and operation of the fragment operations processing stage 116 and the visibility pretest apparatus and method of the present invention are discussed in detail below.

FIG. 2 is a detailed system block diagram of the fragment operations processing stage 168 configured in accordance with the present invention and frame buffer and control processing stage 170, both of which were introduced above in the illustrative OpenGL graphics processing pipeline 500 shown in FIG. 1B. As is well-known in the art, the prior processing stages perform numerous calculations to rotate, translate and scale an object, determine the lighting and perspective of the object, determine which pixels in the display window are effective, and determine the colors of those pixels. These prior processing stages result in the determination of where an individual fragment is to be generated and the color of that fragment. The fragment operations processing stage 168 contains a number of operational modules which together determine how and whether each fragment is drawn as a pixel into the frame buffer 232. The operational modules illustrated in FIG. 2, with the exclusion of the operational modules and control/data flow lines associated with the present invention, perform operations in accordance with the OpenGL specification introduced above. Accordingly, these operational modules are discussed only to the extent necessary to describe the functions and operations of the present invention.

Upon receipt of the fragments from the rasterization processing stage 164, the visibility pretest module 202 may process the fragments in a manner described below to determine whether the fragments will be subsequently rendered on the display screen. The functions and operations of the visibility pretest module 202 of the present invention are described in detail below. Prior to discussing the visibility pretest module 202 in detail, the modules which are included in the fragment operations stage 168 are described.

Typically, the first operation which may be encountered ir the fragment operations stage 168, is texturing wherein a texel (texture element) is generated by the texel generation module 204 from texture memory 206 for each fragment and applied to the fragment at texture application module 208. Then fog calculations may be applied at module 210. Computer images sometimes seem unrealistically sharp and well-defined. An image may appear more natural by adding fog which makes the objects shade into the distance. As is well-known, "fog" is a general term that describes similar forms of atmospheric effects. It can be used to simulate such atmospheric effects as haze, mist, smoke or pollution. At operational module 212, antialiasing operations are performed to make an object appear more realistic by smoothing its edges. Oftentimes nearly horizontal or nearly vertical lines appear jagged due to the line being approximated by a series of pixels that lie on a pixel grid. This jaggedness, referred to as aliasing, is reduced by the operations performed in the antialiasing operational module 212. The pixel ownership test operational block 214 enables graphics application 106 to selectively eliminate portions of the displayed image by clearing their respective buffers in the frame buffer 232. These buffers include, for example, a color buffer, depth buffer, accumulation buffer and stencil buffer, all of which are considered to be well-known in the art and described in detail in the "OpenGL Reference Manual," "OpenGL Programming Guide," and "OpenGL Specification," incorporated above.

At operational block 216, a scissor test may be performed to define a rectangular portion of the video display window and restrict drawing to take place within that defined window. If a fragment lies inside the rectangle, it passes the scissor test. An OpenGL context is in what is commonly referred to as an RGBA mode if its color buffers store red, green, blue and alpha color components rather than color indexes. When in the RGB mode, an alpha test may be performed at operational module 218 to allow the graphics application to accept or reject a fragment based upon its alpha value. If enabled, the alpha test compares the incoming alpha value with a reference value. The fragment is accepted or rejected depending upon the result of the comparison. This test may be used for many applications such as, for example, implementing transparency in portions of a displayed image.

A stencil test may be performed at operational block 220. Stenciling applies a test that compares a reference value with the value stored at a pixel in the stencil buffer. Depending upon the results of the test, the value in the stencil buffer is modified. The graphics application may determine the particular comparison function which is used, the reference value and the modification performed with well-known OpenGL commands. Stenciling is typically used to restrict drawing to certain portions of the screen and may be used, for example, to mask out an irregularly shaped region of the screen to prevent drawing from occurring within it. Other uses of stenciling include capping, achieving certain desired effects in overlapping translucent polygons, and drawing an image with a stipple pattern.

For each pixel on the screen, a depth buffer keeps track of the distance between the viewpoint and the object occupying the pixel. The depth buffer test performed in operational module 222 uses the depth buffer for hidden-surface elimination. If a new candidate color for a pixel appears, it is drawn only if the corresponding object is closer than the previous object with which the pixel was associated. In this way, after an entire scene has been rendered, all the objects that are not obscured by other items remain.

Once an incoming fragment has passed all of the above-noted tests, it can be combined with the current contents of the color buffer in one of several ways. In the operational block 224, blending may be implemented to combine the incoming fragment R, G, B and α values with those of the pixel already stored at that location. Different types of blending operations are generally available. At operational block 226, the color resolution of an image may be improved at the expense of spacial resolution by dithering the color in the image. Finally, at operational block 228, logical operations are applied to the values of the incoming fragment and/or the values currently stored in the color buffer. The results of the operations performed in the fragment operations processing stage 118 are provided to the frame buffer and control processing stage 170 in a manner which is well-known in the art to result in only the desired pixels being rendered in their desired color.

Although the tests performed in operational modules 212–222 are performed sequentially and only when the prior fragment tests do not eliminate the fragment, the fragment operations processing stage 168 consumes a significant amount of processing bandwidth in the graphics pipeline 100. It has been determined that a critical performance issue arises due to the sequence of processing that is performed in the fragment operation processing stage 168 of the graphics pipeline 100. As a fragment progresses through the fragment operations processing stage 168, additional operations are continually being performed on that fragment to determine how and whether the fragment is drawn as a pixel into the frame buffer 232. These per-fragment operations are often time-intensive, and contribute significantly to the processing time associated with the fragment operations stage 168. Certain operational modules are computationally expensive in that they perform a great deal of calculations and other data manipulation functions. For example, the texel generation module 204 performs a significant number of computations to generate the texture elements.

Other modules which may be considered to be time-intensive are modules that perform data transfer functions. For example, depth buffer test module 222 reads data from the depth buffer which is located in the frame buffer 232. It should be understood that different implementations will lead one to categorize a particular operational module as one which is time-intensive. For example, certain hardware implementations can read frame buffers faster than others;. Furthermore, certain software implementations of a particular module in the graphics pipeline may be faster or slower than certain hardware implementations. Other factors may be the graphics library and choice of hardware. Furthermore, such determinations are influenced by the distribution of certain functions in hardware, firmware or software. Accordingly, the determination of what is time-intensive is a relative one based upon the graphics system in which the present invention is implemented. A detailed description of the functions and operations of the visibility pretest module 202 to prevent performing such time-intensive operations is described in detail below.

Figure 3:
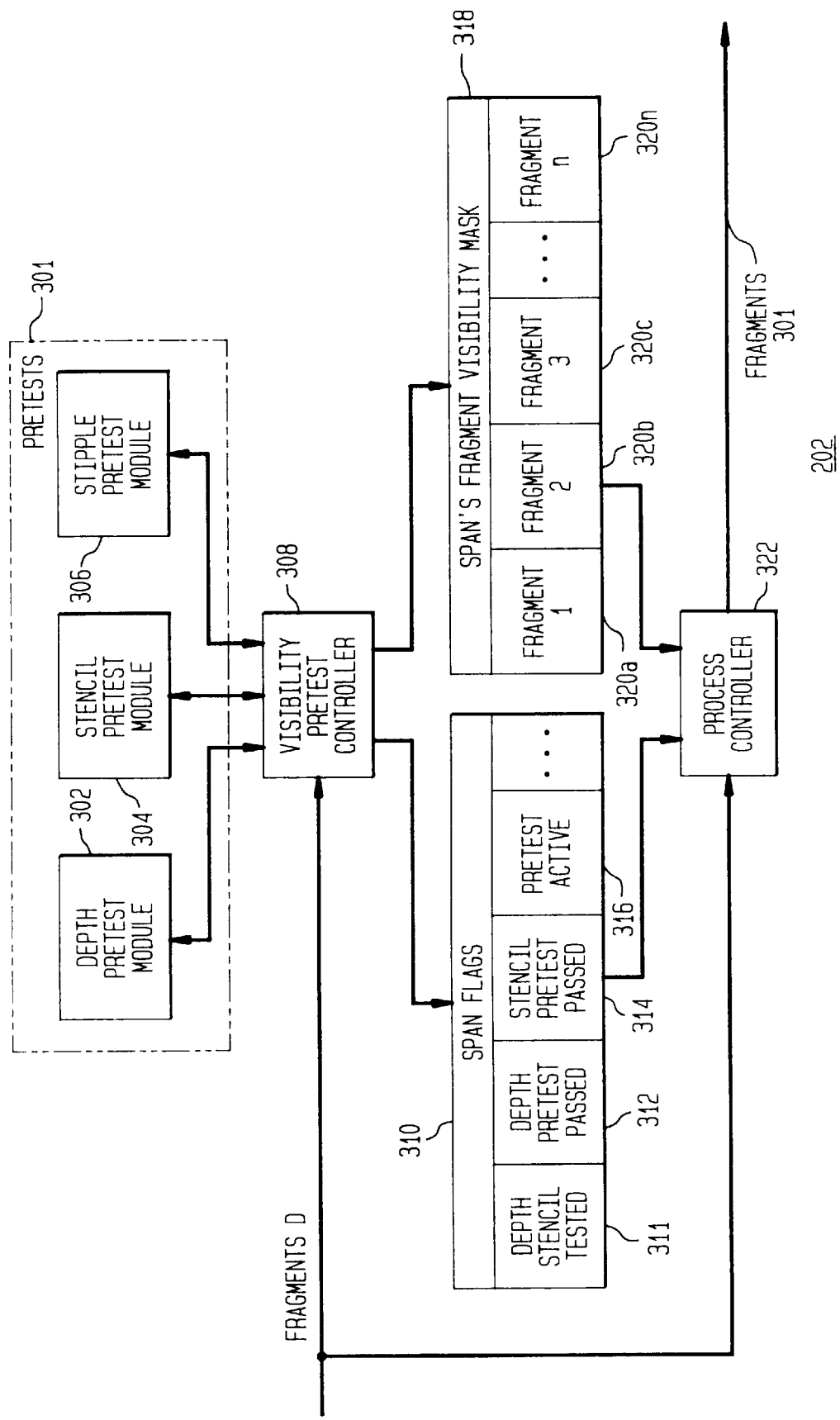
FIG. 3 is a functional block diagram of one embodiment of the visibility pretest module of the present invention.

FIG. 3 is a functional block diagram of one embodiment of the visibility pretest module 202 of the present invention. As noted, the visibility pretest module 202 prevents the performance of time-intensive and other per-fragment operations under certain, predetermined conditions. In a preferred embodiment, these pretests are the same as certain tests performed in the fragment operations processing stage 168 described above with reference to the exemplary OpenGL rendering pipeline 150. Accordingly, these tests are referred to as "pretests" as they are being performed prior to their current operational location as dictated by the implemented graphics pipeline. Since the criteria that is used to determine whether a fragment passes or fails these pretests is whether the fragment contains data which will be used to render a pixel, the apparatus and methodology of the present invention are referred to herein as the visibility pretest apparatus and method or, inclusively, the visibility pretest module 202.

Referring to FIG. 3, the visibility pretest module 202 includes a visibility pretest controller 308 which implements predetermined pretests 301 when certain predetermined conditions occur and a process controller 322 which controls whether subsequent per-fragment operations are implemented for a particular fragment based upon the results of the visibility pretests.

As noted, the visibility pretest module 202 is preferably invoked only under certain predetermined conditions to insure that the visibility pretest module 202 enhances the efficiency of the graphics pipeline 150 in general and the per-fragment operation processing stage 118 in particular. The selective invocation of the visibility pretest module 202 preferably includes certain predetermined conditions when the processing associated with the pretesting of the fragment is outweighed by the savings associated with the elimination of subsequent per-fragment operations which would otherwise be performed on fragments that are ultimately not rendered to the screen.

Accordingly, in a preferred embodiment of the present invention, the visibility pretest module 202 is invoked when texture operations are to be performed on any fragment in a given span. As noted, the generation of texels is computationally expensive and therefore constitutes a time-intensive operational module. The performance of other time-intensive operations may also be considered in determining when to invoke the visibility pretest module 202.

In another preferred embodiment, other conditions are considered in addition to whether time-intensive operations are going to be performed. As one skilled in the relevant art would find apparent, the inclusion of such conditions are preferably balanced by the efficiency savings which may result. For example, in one preferred embodiment, the visibility pretest module 202 is implemented when it is determined that stippling is enabled by the graphics application 106 in addition to texel generation. Although stippling is not a time-intensive operation, the determination of whether it is to be applied to a fragment may be performed quickly and easily in the illustrative embodiment illustrated in FIG. 2.

With respect to the visibility pretests which are performed by the visibility pretest module 202, there are a number of per-fragment operations which identify whether a fragment is to be displayed and which are performed during the fragment operations processing stage 168 of the graphics pipeline 100. These operations were introduced above with respect to FIG. 2. In one embodiment of the present invention, certain ones of these fragment operations ar, performed in the visibility pretest module 202. The determination as to which fragment operations are incorporated in the visibility pretest module 202 preferably include those which either individually or collectively identify a fragment as being visible or non-visible, as well as those fragment operations which individually or collectively are significantly operationally independent of their predecessor and successor operational modules. The latter embodiment is directed towards reducing the costs associated with redundant hardware and software as well as processing time associated with the incorporation of the fragment test in the visibility pretest module 202. This is described further below.

There are tradeoffs associated with the incorporation of a fragment operation into the visibility pretest module 202. Certain operational modules are dependent upon the predecessor modules and are therefore more difficult to incorporate into the visibility pretest module 202 despite the fact that they provide indications as to whether the resulting fragment will be rendered on the video display screen. Likewise, certain other fragment operations are dependent upon successor operational modules in the processing stage 118. These may also be difficult to incorporate into the visibility pretest module 202 for the same reasons.

However, although a module may be dependent upon a second module, that second module may not be dependent upon other operational modules. As a result, the two operational modules may be collectively performed in the visibility pretest module 202. Thus, in accordance with the present invention, one or more pretest modules which are collectively and operationally sufficiently independent of the targeted time-intensive module(s) and other predecessor and successor operational modules may be incorporated in the visibility pretest module 202. It is noted that the predecessor operational modules of concern are those that are operationally located between the targeted module and the initial or original operational location of the pretest module.

In a preferred embodiment of the present invention, the pretest modules 301 include a depth pretest module 302, a stencil pretest module 304, and a stipple pretest module 306. The depth pretest module 302 performs well-known depth test operations in accordance with the OpenGL specification as described above. Depth testing operations do not generate values which are used by other operational modules in the fragment operations stage 168. The depth test does, however, rely on values generated by the stencil test module 220. Accordingly, in one preferred embodiment of the present invention, the pretests 301 also include the stencil pretest module 304 which performs the fragment visibility tests performed by the stencil test module 220. As a result, the performance of the depth and stencil tests which are normally performed by the operational modules 222 and 220, respectively, may be performed by the visibility pretest module 202 while maintaining the specification of the existing graphics pipeline 100.

As noted, the pretest modules 301 include a stipple pretest module 306. The stippling pretest module 306 accesses a stipple mask array to determine whether or not the pixel associated with the current fragment is to be rendered on the video display screen. If the stipple mask array indicates that the pixel is not used, then the fragment associated with that pixel will not be processed further, either in the visibility pretest module 202 or otherwise. It is understood that the depth pretest module 302 and the stencil pretest module 304 operate in the same manner as specified in the OpenGL graphics pipeline.

As noted, not all operational modules in the fragment operations processing stage 168 may be incorporated into the visibility pretest module 202 due to their dependency upon predecessor and successor operational modules. For example, the alpha test 218 utilizes alpha values which are modified by the texture mapping operations performed by operational modules 204–208. Accordingly, in the noted preferred embodiment, such fragment visibility operations are not incorporated into visibility pretest module 202. However, in an alternative embodiment, the visibility pretest module 202 includes operations to retrieve the alpha value from the texture application 208 in order to determine whether the fragment is going to be rendered non-visible due to failure of the alpha test. An example of such a test would simply be a test performed to determine whether the alpha value is zero. In accordance with the OpenGL specification, such a alpha value means that the pixel is totally transparent and therefore not rendered to the screen.

Likewise, the logic operations module 228 performs operations that require the results of its predecessor operational modules as well as the values in the color buffer which itself is dependent upon many processes performed by operational modules between the texel generation module 204 and the logic operations module 228. Therefore, these predecessor operations must first be performed prior to performance of the logic operations 228. Accordingly, the logic operations 228 is preferably not included in the visibility pretest module 222.

In addition to the dependencies on predecessor and successor operational modules, other limitations may prevent the incorporation of a fragment operational module into the visibility pretest module 202. For example, the hardware of conventional graphics pipelines which perform the depth tests are located at the end of the graphics pipeline and access the depth buffer. To read the pipeline prior to texel generation would require the incorporation of additional hardware for the rasterization module 164 to access the depth buffer. Thus, the incorporation of the depth test module 212 into the visibility pretest module 202 would require additional hardware complexity for performing this buffer access operation prior to the texel generation module 204. The incorporation of such hardware redundancy in the fragment operations processing stage 168 may not be justified by the resulting savings.

It should be understood that other fragment operations performed in the fragment operations processing stage 168 may be incorporated into the visibility pretest module 202. For example, the pixel ownership test performed by operational module 214 may be incorporated into the visibility pretest module 202. This incorporation will require the visibility pretest module 202 receiving the various clear control commands and values from the frame buffer and control processing stage 120.

Likewise, in another alternative embodiment, the visibility pretest module 202 may include the scissor test operational module 216. As one skilled in the relevant art would find apparent, other fragment operations now or later developed may be incorporated into the visibility pretest module 202 if such fragment operations are sufficiently operationally independent from their successor operational modules and their predecessor operational modules interposed between the fragment operation and a targeted operation the performance of which is desired to be limited. Such fragment visibility operations are to provide an indication, either individually or collectively, of the visibility of the fragment.

In a preferred embodiment of the present invention, the depth pretest module 302 and the stencil pretest module 304 each perform all of the operations which are associated with the operational modules 222 and 220, respectively. That is, the depth pretest module 302 and the stencil pretest module 304 perform operations in addition to those necessary to determine if the fragment is visible. As a result, when the depth pretest module 302 and the stencil pretest module 304 are implemented, the corresponding operational modules 220 and 222 may be bypassed as shown by data/control line 230.

It should be noted that the incorporation of the visibility pretest module 202 of the present invention in the per-visible fragment operations processing stage 168 prior to the texel generation module 204 results in the span of fragments received from the rasterization stage being traversed twice. This is described below.

The data which is received from the rasterization processing stage 114 is provided to the fragment operations processing stage 168 in the form of spans. A span consists of starting values, slopes, an X, Y and horizontal length of the pixels to render. As noted, this information constitutes a series of fragments. Accordingly, a span consists of a predetermined number of fragments as defined herein. As is well-known in the art, one fragment corresponds to a single pixel and, according to the OpenGL specification, contains all the data necessary to render that pixel to the screen.

In conventional systems, the span is traversed once as it progresses through the fragment operations processing stage 168. As the span is traversed, all of the testing noted above is performed and the calculations which are associated with each of the operational modules are performed simultaneously with the associated test. By contrast, when performing a visibility pretest operation of the present invention, the span is traversed twice. The span is traversed once during the processing performed by the visibility pretest module 202 to determine whether the fragment will be rendered to the video display screen. The span is traversed a second time during the subsequent per-fragment operations, and only for those spans which have at least one visible fragment. However, the elimination of the fragment operations which would otherwise be performed for the non-visible pixels far outweighs the additional processing associated with the dual traversal of the span.

The visibility pretest controller 308 invokes the pretest modules 301 and sets globally available flags in memory for use by the processor controller 322 to determine which subsequent fragment operations are to be performed. In accordance with the present invention, the visibility pretest module 202 includes a fragment visibility mask 318 having a series of bits 320 each associated with a fragment in a current span to be processed in the fragment operations processing stage 118. The visibility pretest controller 308 sets or clears the bit in the mask 318 associated with each fragment in accordance with whether the fragment passed or failed all of the visibility pretests incorporated in the pretest modules 301.

The visibility pretest module 202 also controls a number of flags in a span flags array 310 to identify whether a fragment has passed the depth and stencil pretests. Accordingly, the span flags array 310 includes a depth pretest passed boolean 312 and a stencil pretest passed boolean 314. The span flags array 310 also includes a pretest active flag 316 for use by other operational modules to determine when the visibility pretest module 202 has been invoked. In addition, the span flags array 310 includes a depth/stencil tested flag which is set by the controller 308 whenever either the depth test or the stencil test are performed.

As noted, the process controller 322 access the span flags array 310 and the visibility mask 318 to control the processing of subsequent fragment operations such as the texel generation module 204 and other per-fragment operations modules included in the fragment operations processing stage 118. Specifically, when a fragment is determined to be not be visible, then subsequent per-fragment operations, preferably including the texel generation module 204 are not performed.

Figure 4A:
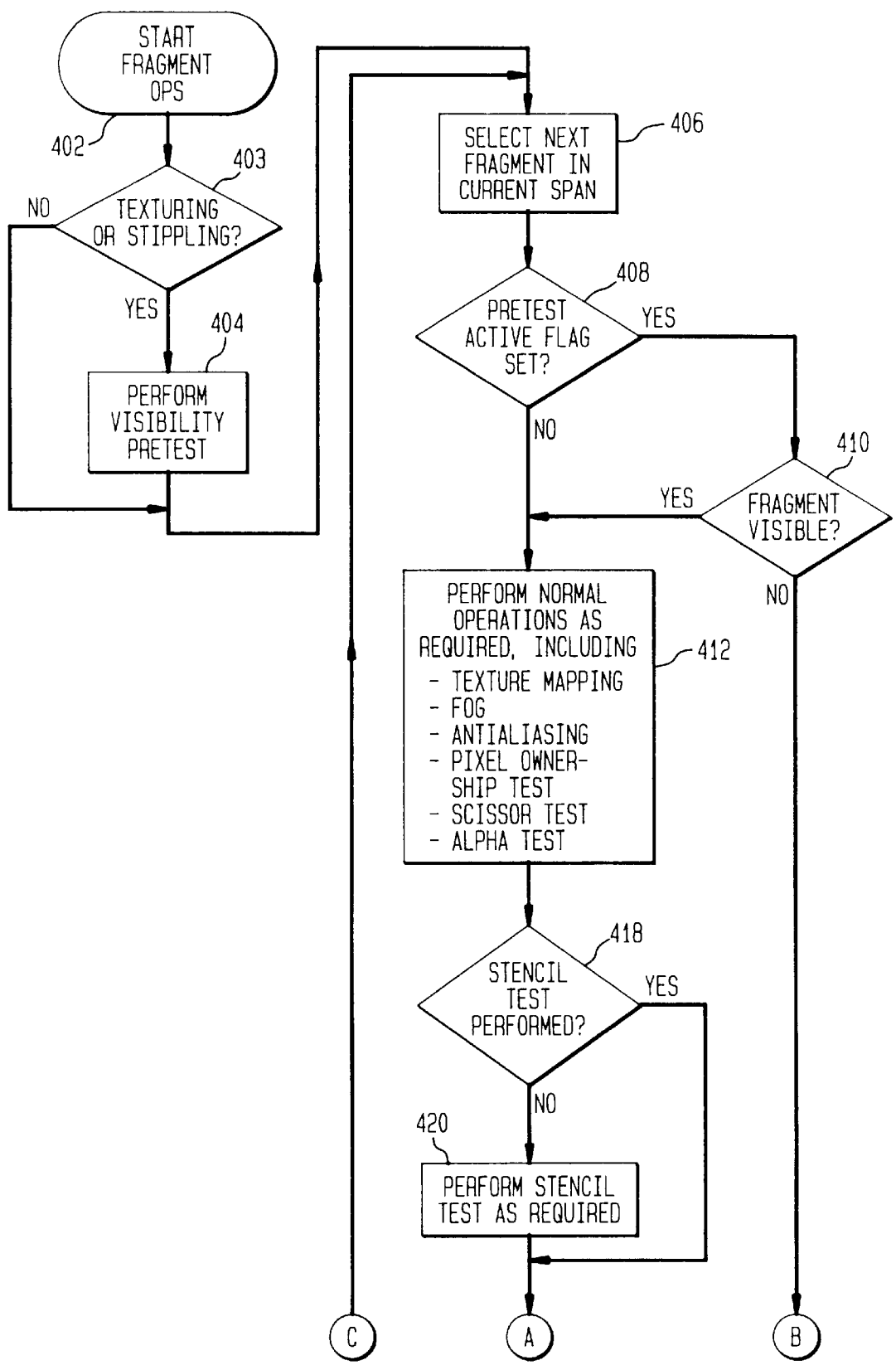
FIGS. 4A and 4B are a flow chart of the processes performed and the per-visible fragment operations module illustrated in FIG. 1B.
Figure 4B:
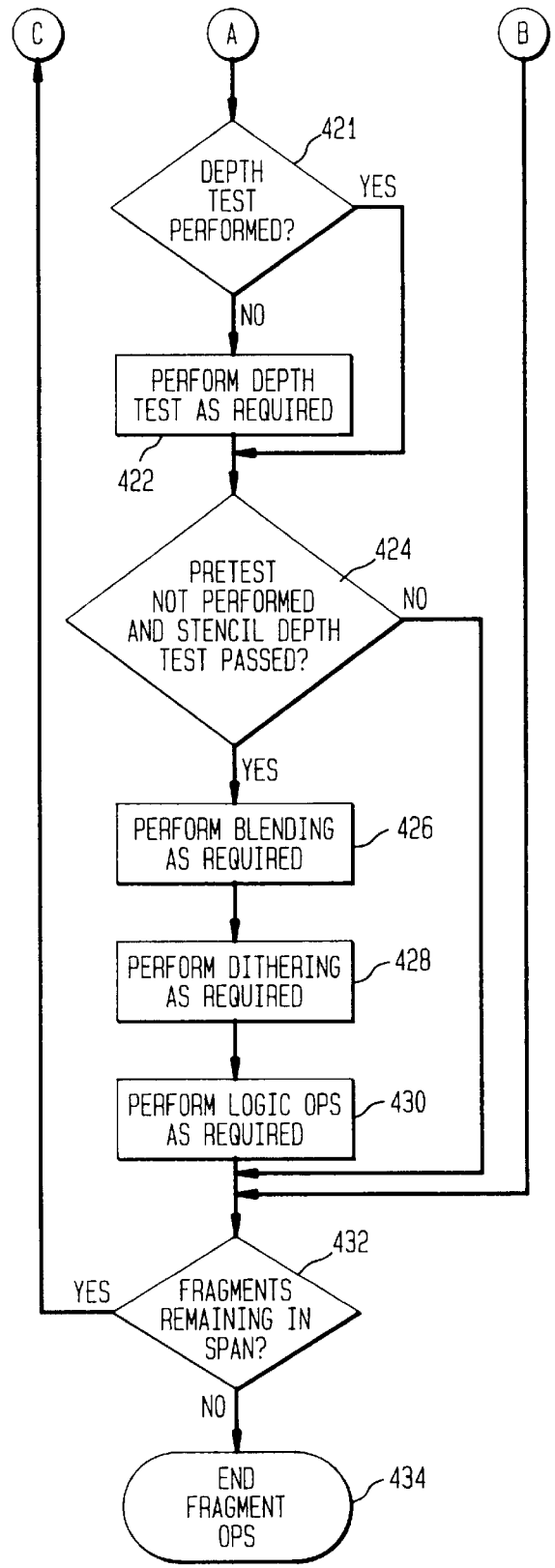

FIGS. 4A and 4B are a flow chart of one embodiment of the processes performed by the fragment operations processing stage 168 of the present invention. Upon receipt of a span from the rasterization processing stage 164, the processing stage 168 advances from a start block 402 to block 403 wherein the visibility pretest module 202 determines whether the visibility pretest is to be performed. In a preferred embodiment, the visibility pretest is performed when texture or stippling has been enabled by the graphics application 106 for any fragment within the current span. If so, then the visibility pretest for the present invention is performed at block 404. Otherwise, the fragment operations illustrated in FIGS. 4A and 4B progress without the benefits of the visibility pretest. The selective invocation of the visibility pretest methodology of the present invention insures that the visibility pretest is performed only when desired and when it is deemed efficient to do so.

As noted above, the performance of the visibility pretest results in the generation of span flags 312–316 and visibility mask 318 in accordance with the present invention. This process is further described in detail below with reference to FIGS. 5A and 5B. Upon the completion of the visibility pretest at block 404, the first and succeeding fragments in the current span are selected to be processed through the per-fragment operation stage 168 of the graphics pipeline 150.

If the visibility pretest was performed (block 408) then processing continues at block 410 wherein the visibility mask 318 is read to determine if the current fragment is visible. If the visibility pretest was not performed (block 408) or was performed and the fragment is visible (block 410), then normal per-fragment operations occur. If it is determined that the fragment is not visible it block 410, then processing continues at decision block 432 to continue traversing each of the fragments in the current span.

At block 412, normal per-fragment operations are performed, as required. These operations may include, for example, texture mapping operations, fog operations, anti-aliasing operations, pixel ownership test operations, scissor test operations and alpha test operations. As noted, these operations are performed in accordance with the OpenGL specification. However, other implementations of the graphics pipeline may include additional and/or different per-fragment operations.

As noted, in a preferred embodiment of the present invention, the visibility pretest module 202 performs all operations associated with the stencil test and depth test operational modules 220 and 222. Accordingly, if the visibility pretest was performed at block 404, then there is no need to perform the processes again when the fragment arrives at the stencil test operational module 220 or the depth buffer test operational module 222. Accordingly, if the stencil test was already performed (block 418) then the processes performed at block 420 is not performed. Likewise, if the depth test was already performed (block 421) then the processes performed at block 422 is not performed. Otherwise, the stencil and/or the depth tests are performed as required as shown in blocks 420 and 422, respectively.

At decision block 424, it is determined whether the fragment passed the stencil and depth tests performed at processing blocks 420 and 422. If the fragment did not pass either one of these tests, then the processing performed at blocks 426–430 are not implemented since the fragment is not visible. Otherwise, the fragment is considered to be visible at this point in the graphics pipeline and the remaining steps are performed. At block 426, blending operations are performed as required; at block 428, dithering operations are performed as required; and at block 430, logic operations are performed as required. The above processes are repeated for all of the fragments as indicated by decision block 432. Processing then ceases at end block 434.

Figure 5A:
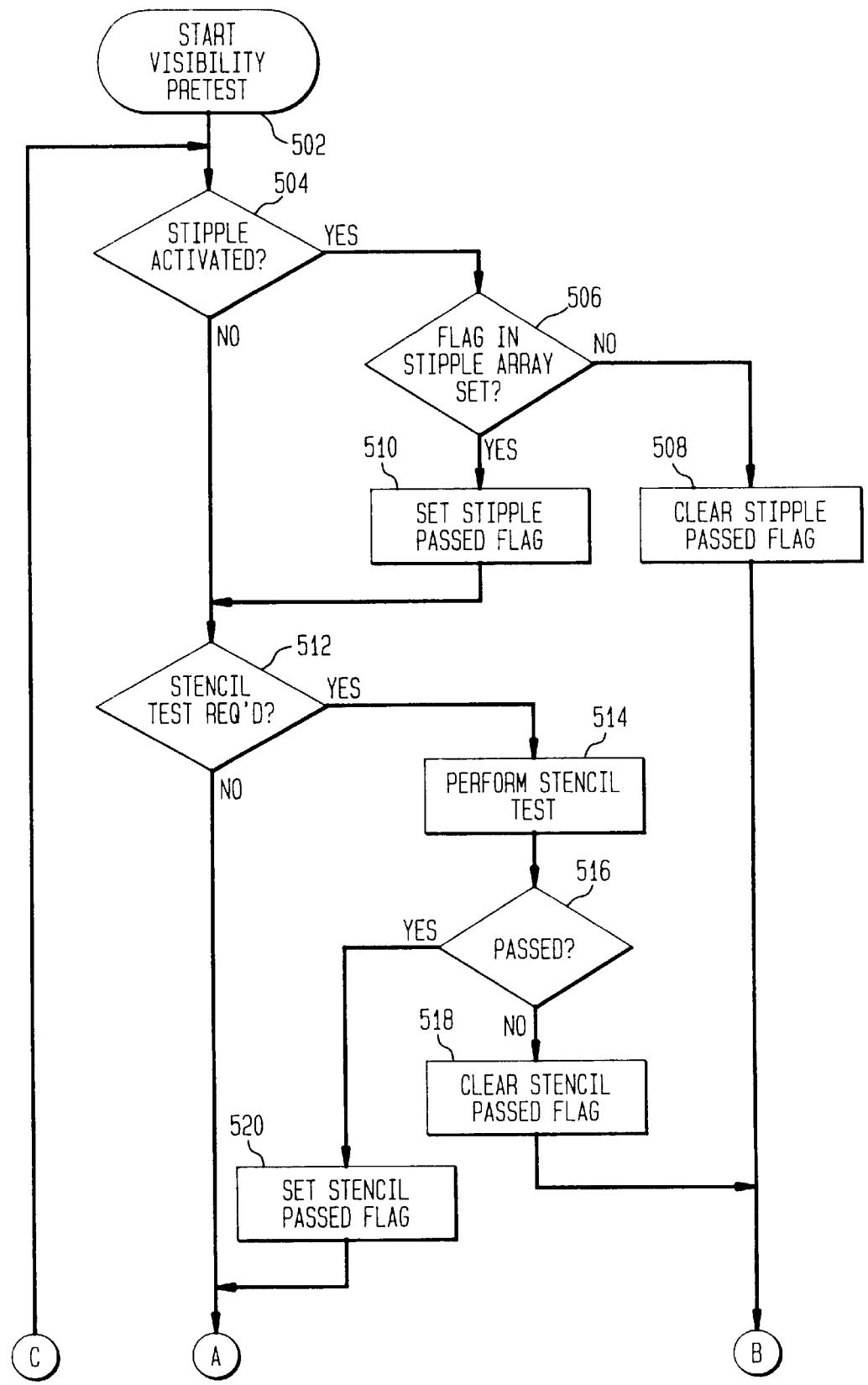
FIGS. 5A and 5B are a flow chart of one embodiment of the visibility pretest methodology of the present invention.
Figure 5B:
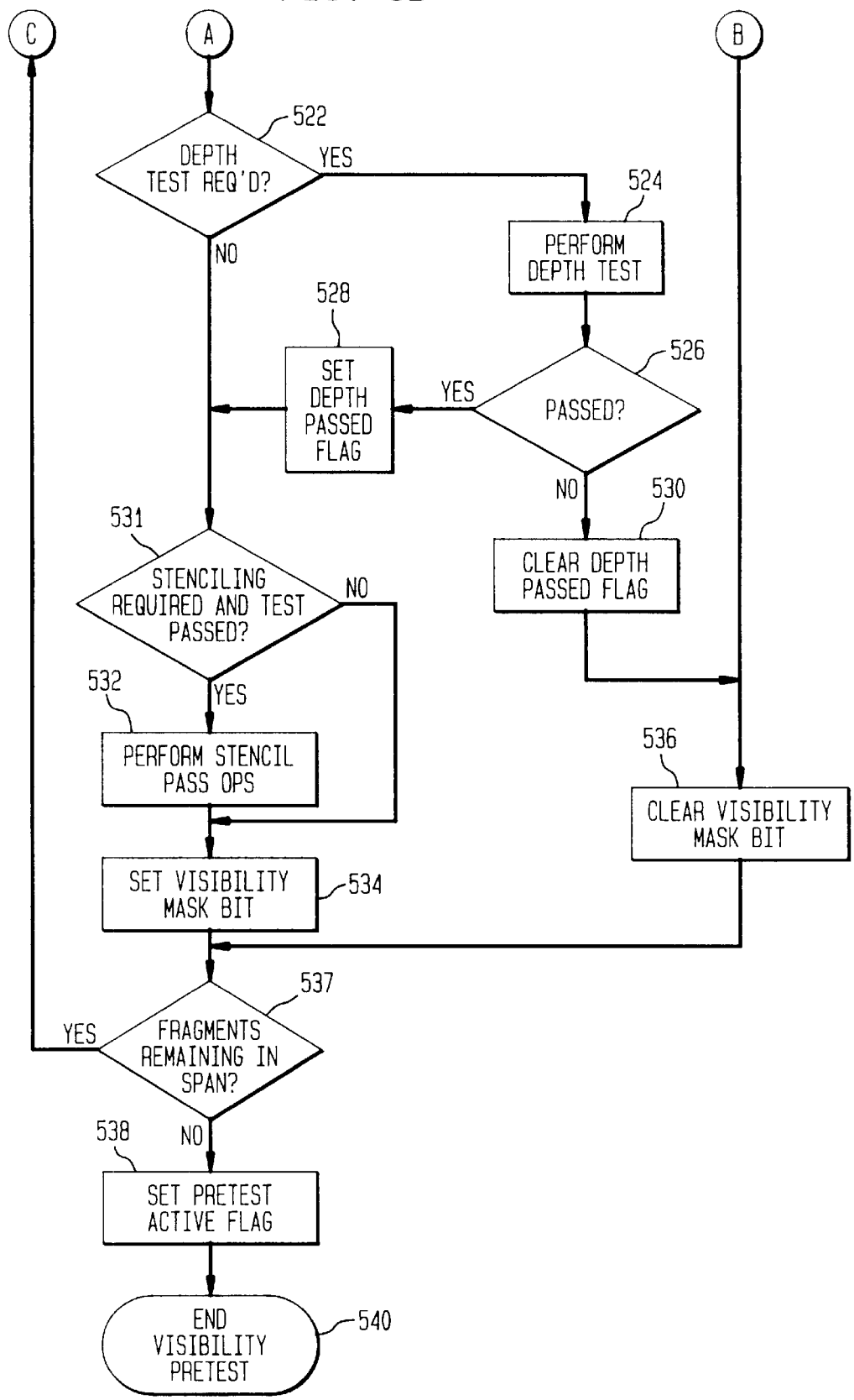

FIGS. 5A and 5B are a flow chart of one embodiment of the visibility pretest process of the present invention. As noted above, the visibility pretest methodology is selectively implemented. In a preferred embodiment of the present invention, this occurs when either texturing or stippling is required to be performed. As noted, the visibility pretest traverses the fragments in the current span to determine which fragments are visible as determined by the selected pretests 301.

After start block 502, processing advances to block 504 whereat the visibility pretest module determines whether the invocation of the visibility pretest process is due to the graphics application 106 implementing stippling for one or more fragments in the current span. If so, then the visibility pretest module 202 invokes the stipple pretest module 306 to access the bit associated with the pixel in the stipple array. The reading of the stipple array is considered to be well known in the art. If the stipple pretest module 306 determines that the associated bit is set, then the pixel will not be non-visible due to stippling. Accordingly, the stipple passed flag in the span flags array 310 is set at block 510. However, if the associated bit in the stipple array is not set, then the stipple passed flag 318 in the span flags array 310 is cleared to indicate that the pixel is not visible. Since the fragment is not associated with a visible pixel, then all further processing for this fragment is not performed and processing continues at block 536 discussed below.

If stippling is not activated, or if stippling is activated and this fragment passed the stipple pretest, then the visibility pretest module determines whether performing the stencil test is required at block 512. If so, then processing proceeds at block 514 wherein the stencil pretest is performed. As noted, this test is a well-known test which, in the illustrative environment, is preferably performed in accordance with the OpenGL specification. At block 514 the stencil failure functions are also performed. If the fragment passes the stencil pretest (block 516), then the stencil pretest passed flag 314 in the span flags array 310 is set. Otherwise, the flag is cleared at block 518. If the fragment failed the stencil test, then the fragment will not be visible and processing continues at block 536 described below. If the fragment passed the stencil test, then the fragment will not be non-visible due to stenciling, and processing continues at block 522.

At block 522 the visibility pretest module 202 determines whether depth testing is required. If depth testing is required, then processing continues at block 524 wherein the depth pretest is performed. As noted, the depth pretest is the same pretest as that performed in module 222 and, in the illustrative embodiment described herein, is performed in accordance with the OpenGL specification. If the fragment passed the depth pretest (block 526), then the fragment is not non-visible due to depth testing and the depth pretest passed flag 312 is set at block 528. Otherwise the flag is cleared at block 530 and processing continues at block 536 discussed below.

If the visibility pretest process determines that the fragment is not visible, due to failing either or all of the stipple, stencil or depth pretests, then the flag 320 associated with the fragment in the visibility mask 318 is cleared. However, if none of the tests are performed, or if they are performed and the fragment passes the pretests which are performed, then the fragment is considered tc be a visible fragment.

If the fragment is visible, then operations associated with the well-known stencil passage of the stencil test operational module 220 are performed at block 532. The associated bit 320 in the visibility mask 318 is set at block 584 to indicate to other operational modules that the visibility pretest module 202 passed the fragment. Upon completion of the pretest 301, the pretest active flag 316 in the span flags array is set at block 538. This flag is read by subsequent operational modules. Processing then completes at block 540.

While various embodiments of the present invention have been described above, it should be understood that they have been presented by way of example only, and not limitation. For example, in an alternative embodiment, the visibility pretest controller 308 may provide the processor controller 322 with the necessary information regarding the visibility of the fragments in a manner other than through the span flags 310 or the visibility mask 318. Any such implementations are considered to be well-known in the art. In addition, it should be understood that the visibility pretest module 202 may be implemented in the graphics library, graphics hardware, or a combination of the two. In other words, the visibility pretest module 202 may be implemented in software, hardware, firmware, or a combination thereof. In addition, as noted above, the pretests 301 may include any pretest which identifies a fragment as being visible or non-visible and which has insignificant interdependencies with the predecessor and successor operational modules. It should be further understood that the concept of the present invention may be implemented in other processing stages of the graphics pipeline such as the pre-vertex operations and primitive assembly processing stage 110 and the pixel operations processing stage 112. In addition, the visibility pretest module 202 may be implemented in other graphics pipelines having other configurations. For example, it is common to include the pixel ownership and the scissor tests in the rasterization processing stage 164. In such a graphics pipeline, the visibility pretest module 202 may be implemented as described above to include the depth and stencil tests, supplementing the processing performed in such a graphics pipeline. Thus, the breadth and scope of the present invention are riot limited by any of the above-described exemplary embodiments, but are defined only in accordance with the following claims and their equivalents.

What is claimed is:

1. A computer graphics system for processing graphics information to be rendered on a display, the system including a graphics library and graphics hardware together defining a graphics pipeline, the system adapted to execute a graphics application program invoking operations in the graphics pipeline through an application program interface provided by the graphics library, the graphics pipeline comprising:

a fragment operations processing stage including:
a visibility pretest module, located operationally at a first operational position in said fragment operations processing stage, configured to perform predetermined per-fragment operations to determine whether a fragment will be visible or non-visible on the display screen.

2. The system of claim 1, wherein said fragment operations processing stage further comprises:

one or more fragment operation modules each located at an operational position in said fragment operations processing stage subsequent to said first operational position; and a process controller configured to prevent performance of said one or more fragment operation modules when said visibility pretest module determines that a fragment will be non-visible on the display screen.

3. The system of claim 2, wherein said one or more fragment operation modules comprises:

one or more computationally-expensive modules.

4. The system of claim 3, wherein said one or more computationally-expensive modules comprises:

a texel generation module configured to generate a texel for each fragment.

5. The system of claim 1, wherein said one or more fragment operation modules comprises:

one or more fragment operation modules that access graphics hardware components of the graphics pipeline.

6. The system of claim 5, wherein the graphics pipeline includes a frame buffer and wherein said one or more fragment operation modules comprises:

one or more fragment operation modules that read data from said frame buffer.

7. The system of claim 1, wherein said visibility pretest module comprises:

one or more pretest modules each performing per-fragment operations in said fragment operations processing stage of the graphics pipeline, each said pretest module determining whether each fragment received by said fragment operations processing stage will be visible on the display, wherein each of said one or more pretest modules is operationally-independent of said one or more fragment operation modules.

8. The system of claim 7, wherein said visibility pretest module performs fragment operations normally performed by said fragment operation modules.

9. The system of claim 7, wherein said one or more pretest modules comprises:

a depth pretest module for performing a depth test for each fragment received by said fragment processing operation stage; and a stencil pretest module for performing a stencil test for each fragment received by said fragment processing operation stage.

10. The system of claim 9, wherein said one or more pretest modules further comprises:

a stipple pretest module for performing a stipple test for each fragment received by said fragment processing operation stage.

11. The system of claim 1, wherein the graphics library comprises OpenGL graphics library.

12. The system of claim 1, wherein said one or more fragment operation modules comprises:

a fog calculation fragment operation module.

13. The system of claim 1, wherein said one or more fragment operation modules comprises:

an anti-aliasing fragment operation module.

14. The system of claim 1, wherein said one or more fragment operation modules comprises:

a pixel ownership test fragment operation module.

15. The system of claim 1, wherein said one or more fragment operation modules comprises:

a blending fragment operation module.

16. The system of claim 1, wherein said one or more fragment operation modules comprises:

a dithering fragment operation module.

17. A fragment operations processing system for reducing th time necessary to render an image in a computer graphics system operationally coupled to a display device, comprising:

one or more per-fragment operations modules;

a visibility pretest module constructed and arranged to pretest a fragment to determine whether the fragment will be displayed on the display device, wherein said visibility pretest module is operationally performed prior to performance of said one or more per-fragment operations modules, wherein each said one or more per-fragment operations modules does not process fragments identified by said visibility pretest module as a fragment that will not be displayed on the display device.

18. The system of claim 17, wherein said visibility pretest module performs one or more per-fragment operations each of which provides a result used to determine whether each fragment will be rendered on the display device, wherein each of said one or more per-fragment operations is operationally-independent of said one or more per-fragment operations modules.

19. The system of claim 18, wherein said one or more per-fragment operations comprises:

a depth test operation;

a stencil test operation; and a stipple test operation.

20. The system of claim 18, wherein the graphics library comprises OpenGL graphics library.

21. A method for determining whether to perform certain per-fragment operations in a fragment processing stage of a graphics pipeline, the method comprising the steps of:

determining whether each fragment to be processed by the fragment processing stage is to be rendered on a display device operationally coupled to the graphics pipeline; and preventing performance of predetermined per-fragment operations based upon whether said determining step determines that the fragment is not to be rendered to the display device.

22. The method of 21, wherein said determining step comprises:

performing a depth test for each fragment received by said fragment processing operation stage.

23. The method of 22, wherein said determining step further comprises:

performing a stencil test for each fragment received by said fragment processing operation stage.

24. The method of 23, wherein said determining step further comprises:

performing a stipple test for each fragment received by said fragment processing operation stage.

25. The method of 21, wherein said determining step comprises:

performing a stencil test for each fragment received by said fragment processing operation stage.

26. The method of 21, wherein said determining step comprises:

performing a stipple test for each fragment received by said fragment processing operation stage.

27. The method of 21, wherein said predetermined per-fragment operations comprises:

one or more computationally-expensive fragment operation modules.

28. The method of 21, wherein said predetermined per-fragment operations comprises:

a texel generation module configured to generate a texel for each fragment.

* * * * *